Jan. 17, 1961   D. E. KELLY   2,968,292
MARINE ENGINE COOLING SYSTEMS
Filed May 9, 1960   3 Sheets-Sheet 1
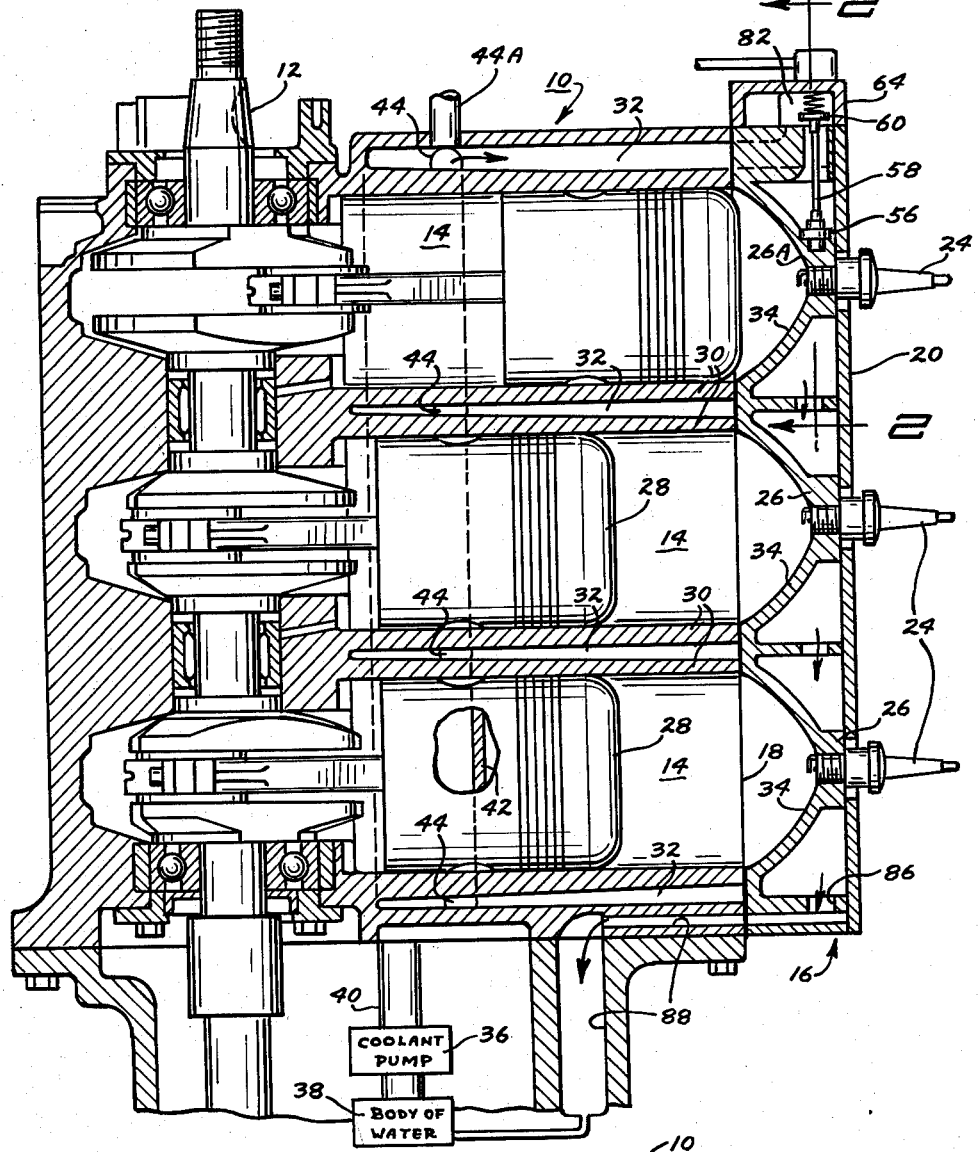
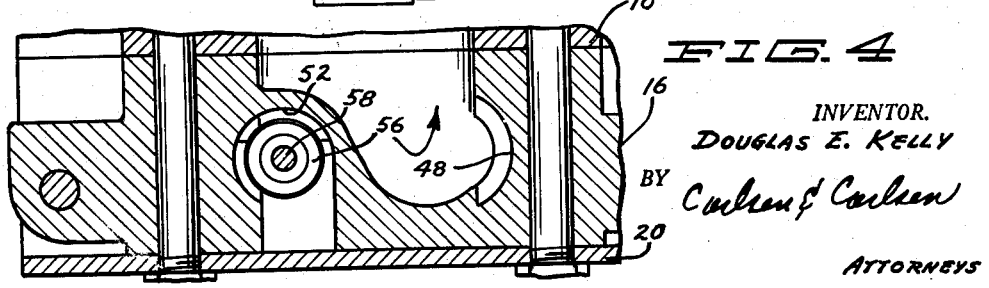
INVENTOR.
DOUGLAS E. KELLY
BY Carlsen & Carlsen
ATTORNEYS Jan. 17, 1961  D. E. KELLY  2,968,292
MARINE ENGINE COOLING SYSTEMS
Filed May 9, 1960  3 Sheets-Sheet 2
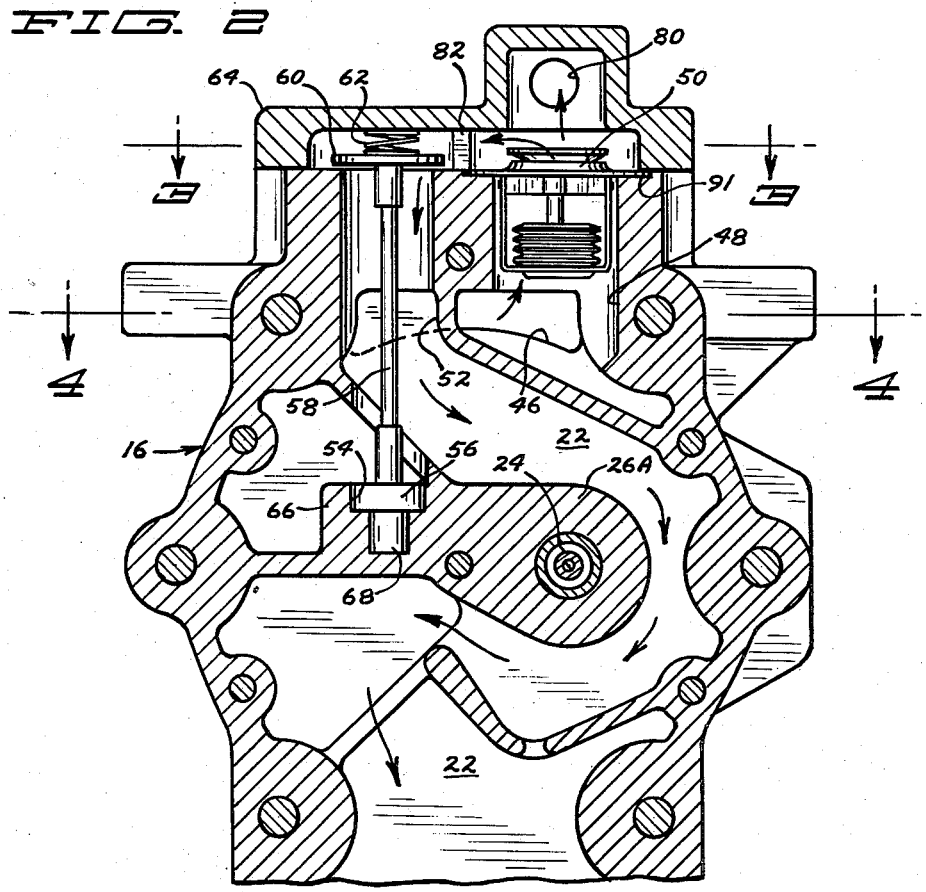
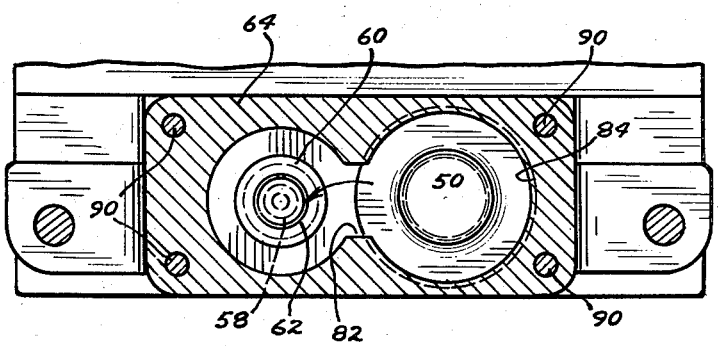
INVENTOR.
DOUGLAS E. KELLY
BY Carlsen & Carlsen
ATTORNEYS Jan. 17, 1961  D. E. KELLY  2,968,292
MARINE ENGINE COOLING SYSTEMS
Filed May 9, 1960  3 Sheets-Sheet 3

INVENTOR.
DOUGLAS E. KELLY
BY
ATTORNEYS

United States Patent Office 2,968,292
Patented Jan. 17, 1961

2,968,292

MARINE ENGINE COOLING SYSTEMS

Douglas E. Kelly, Minneapolis, Minn., assignor to McCulloch Corporation, Minneapolis, Minn., a corporation of Minnesota Filed May 9, 1960, Ser. No. 27,606

11 Claims. (Cl. 123—41.08)

This invention relates to marine engine cooling systems of the non-recirculating type, and more particularly to such systems wherein the coolant flow through the cylinder head is controlled by the temperature thereof.

In marine engines, especially of the outboard type, it is common practice to draw water for cooling the engine from the lake, river and the like, on which the watercraft is operating and to discharge the water from the engine after it has passed through the cooling system only once. When such engines are idling there is a tendency for the cold intake water to reduce the temperature of the cylinder head and therefore the combustion chamber and the spark plug boss to such a point as to cause inefficient ignition resulting in spark plug fouling. Further, when such engines are being operated at high speeds, the cylinder head temperatures have increased to such a point as to cause portions of the combustion chamber to melt, resulting in molten material being splashed around within the cylinder.

Accordingly, it is an object of the present invention to provide an improved cooling system of the non-recirculating type for marine engines in which the temperature of the cylinder head controls the flow of coolant through the cylinder head cooling chamber.

It is another object to provide a non-recirculating cooling system for a marine engine in which the operating temperature of the cylinder head is held substantially constant between idling and full throttle operations.

It is another object of this invention to provide a marine engine cooling system of the non-recirculating type wherein the spark plug temperature is maintained at a predetermined temperature during idling irrespective of the block and coolant temperatures.

In a preferred form of the present invention a spearate cooling chamber is provided for both the cylinder head and block members. A temperature sensing element is embedded within one spark plug boss or extension thereof and operatively connected to a head chamber inlet valve for opening same only when the boss temperature exceeds a predetermined value which is accurately related to the desired operating temperature of the spark plugs used in the engine.

These and other more detailed and specific objects will be disclosed in the course of the following specification, reference being had to the accompanying drawings, in which—

Fig. 1 is a vertical sectional view of an engine for an outboard motor having three vertically stacked cylinders and embodying the teachings of this invention.

Fig. 2 is an enlarged vertical sectional view as taken along the line 2—2 in the direction of the arrows in Fig. 1 and showing a first arrangement for controlling the coolant flow through the cylinder head cooling jacket.

Fig. 3 is a horizontal sectional view taken in the direction of the arrows along the line 3—3 in Fig. 2 and showing the port arrangement providing the fluid communicative relation between the cylinder block and cylinder head cooling chambers.

Fig. 4 is a horizontal sectional view taken in the direction of the arrows along the line 4—4 in Fig. 2 and showing further details of the Fig. 3 illustrated port arrangement.

Figure 5:
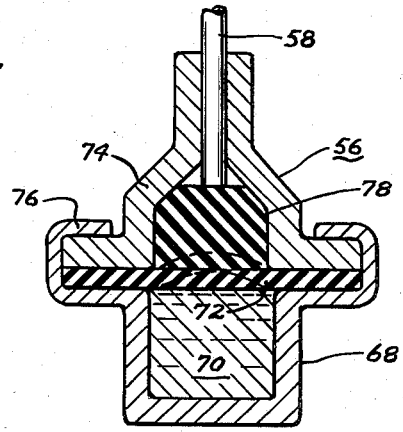
Fig. 5 is an enlarged vertical sectional view of an exemplary pellet-type temperature sensing element as may be used with the present invention.

More particularly referring now to the appended drawing like numerals denote like parts and structural features in the various views. The illustrated marine engine has the usual cylinder block 10 through which a drive shaft is rotatably disposed and in which a plurality of cylinders 14 are formed. A cylinder head 16 is bolted to the block 10 in the usual manner for closing the cylinders 14 and a seal therebetween provided by the usual head gasket 18. A cover plate and sealing gasket 20 are suitably bolted on the upper side of the member 16 for enclosing the head member cooling chamber and jacket generally designated 22. The spark plugs 24 are threadingly supported in the spark plug bosses 26 integrally formed in the head member 16 and disposed into the cylinders 14. As the engine is operated, the pistons 28 reciprocate in the cylinders 14 in the usual manner and the heat from combustion within the cylinder is transmitted through the cylinder walls 30 to the block cooling chamber jacket 32 and through the cylinder top forming head wall 34 to the head member cooling chamber 22.

In the illustrated engine, which is adapted to be used with an outboard motor unit, there is a coolant pump 36 of the rubber impeller type and having an intake in fluid communicative relation to a supporting body of water, schematically indicated by the block 38. As the engine is operated the pump 36 forces water through the tube 40 into a water reservoir 42 disposed alongside the engine. The ports 44 provide fluid communication from the reservoir 42 into the cylinder block cooling chamber 32 for removing the heat from the cylinder walls 30 and controlling the cylinder temperature as will become apparent.

A single port or fluid passageway 46 is provided as a water outlet for the block cooling chamber 32 and leads to the thermostat aperture 48 formed in the head member 16 in its upper end portion. The passageway 46 is formed in both the block 10 and head 16 members. The usual bellows-type thermostat valve 50 permits water to leave the chamber 32 only when the temperature of the coolant water therein exceeds a predetermined temperature, for example 140° F. In this manner the walls 30 are maintained at a temperature conducive to good combustion.

The present invention provides the extension 66 of the spark plug boss 26A which is closest to the chamber 22 inlet 52 and a recess 54 therein for embedding a temperature sensing element 56 to sense the spark plug boss temperature. A rod 58 operatively connects the element 56 to a valve member 60 for moving same as will be described to permit coolant flow through the head chamber. The spring 62 is disposed under compression between the valve 60 and the cap 64 for yieldably urging the valve to engage the periphery of the opening 52 to close same against the element 56 urging.

It has been found that the temperature of the boss portion 26A is directly related to the spark plug 24 and combustion chamber or cylinder 14 operating temperatures, which in actual practice the spark plug housing and boss temperature is about 250° F. at full throttle when the illustrated engine is being used in an outboard motor and a 140° F. thermostat 50 is provided as shown. It has been further found that the temperature within the boss 26A extension 66 varies linearly and decreasingly away from the spark plug 24. With the illustrated recess 54, the element 56 is designed to open the valve 60 when it senses a temperature of 190° F. which provides a spark plug housing temperature of 250° F.

Referring now to Fig. 5 the element 56 preferably consists of a lower cup 68 containing a wax pellet 70 which expands greatly in changing from a solid to a liquid state. The cup 68 is embedded within the extension 66 for receiving heat therefrom for accurately sensing the temperature thereof and being unaffected by the lower coolant temperature. A flexible diaphragm 72 closes the top of the cup 68 and is held in place by an upper member 74. The cup 68 may be provided with the crimped flange 76 for holding the assembly together. As the wax pellet 70 changes state, the rubber plunger 78 is forced upwardly past the constricting walls of the member 74 to move the rod 58 upwardly for opening the valve 60. This particular form of temperature sensing element is preferred as it is resistant to shock and vibration. It is understood, of course, that other temperature sensing elements may be substituted therefor as long as a temperature of the cylinder head member 16 rather than the coolant temperature is used to operate the head member inlet valve 60.

In testing an engine of the type illustrated having a cooling system wherein the intake coolant water with a temperature of 50° F. was passed first through the cylinder block cooling chamber and then through the cylinder head cooling chamber without any thermostatic controls, the coolant temperature at the outlet varied from 50° F. at idling to 125° F. at full throttle. Meanwhile, the combustion chamber temperature varied from 300° F. to as high as 1800° F. respectively at idle and full throttle. From the just described test it can be seen that the coolant temperature in a non-recirculating system while related to the engine operating temperature is not an accurate indication thereof. Further, the coolant temperature changes more slowly than the combustion chamber operating temperatures introducing a lag in the control. Accordingly by sensing the temperature of the spark plug boss or of the cylinder head, itself, the thermostatic control of the engine will be more accurate and will respond more quickly than by sensing the coolant temperature.

With the valve member 60 blocking the inlet aperture or port 52 the coolant from the pump 36 after passing through the thermostatic valve 50 is discharged through the tube 80 to the supporting body of water. The tube 80, in effect, provides a bypass for the head cooling chamber 22. Note that the valve 50 provides a positive block preventing any coolant from passing through the chamber 32 whenever the coolant temperature in the passageway 46 is less than 140° F. For this reason, it is preferred that the pump 36 be of the rubber impeller type for limiting the coolant pressures within the chamber 32 to a reasonable value.

Since no water or coolant flows through or is in the chamber 22, the spark plug bosses 26 and the head member 16 are quickly heated to the desired operating temperature by the heats of combustion from the various cylinders 14. After the desired operating temperature is reached, the element 56 begins to open the valve 60 for permitting coolant to flow from the valve 50 to the port 82 formed in the cap 64 chamber 84. As the coolant flows through the chamber 22 past the various spark plug bosses 26, they are cooled in proportion to the rate of flow and the coolant temperature. Note that the rate of coolant flow is controlled by the boss 26A temperature in that the valve 60 is opening in proportion to said temperature. The coolant leaves the chamber 22 through the port 86 and the passageways 88 from whence it is discharged to the supporting body of water, as indicated by the block 38. With the above described fluid circuits the operating temperature of the spark plugs 24 and the combustion chambers or cylinders 14 are maintained at a constant temperature irrespective of the coolant temperatures.

When such marine engines are idling, the tendency for the head member 16 to cool to below the desired operating temperature is removed since the valve 60 will close off the chamber 22 for preventing any coolant to enter the head member, while the block 10 is still being cooled. In the illustrated embodiment it should be readily apparent that when the valve 60 is blocking the aperture 52 any water in the chamber 22 will be discharged through the port 86 and the passageways 88 into the supporting body of water. The water discharge rate is increased in most outboard motors because the engine exhaust passes by the discharge passageway 88. The pulsating pressures of the exhaust causes air bubbles to be inserted into the passageway from whence they rise into the chamber 22 permitting the water to more freely flow downwardly. A short time after the valve 60 is closed, the chamber 22 is emptied of water. The present invention enables the valve 60 to be opened when the temperature of the extension 66 reaches the predetermined temperature, whereas if a coolant temperature sensing element were used, additional means would have to be provided for opening the valve 60 since there is no coolant in the chamber to sense the temperature thereof during idling or when initially starting and operating the engine.

During idling there is relatively a small amount of heat released from the cylinder 14 and by removing the water from the head, or alternately holding the water therein, the operating temperature of the engine is maintained at a desired value resulting in the prevention of spark plug fouling. It is preferred that the cylinder head be drained as this immediately decreases the rate of heat loss from the cylinders through the chamber 22.

The cap 64 is preferably cast as a unitary member and removably attached to the head member 16 as by the four bolts 90. The member 64, when mounted on the head member, has an annular edge 91 which engages the peripheral flange of the valve 50 for securing same in the illustrated position for covering the aperture 48. The head member 16 may have a recessed and annular groove around the aperture 48 upper end for receiving the valve 50 peripheral flange. By removing the four bolts 90 and the cap 64 both thermostatic valves 50 and 60 may be inspected and replaced. Note that the temperature sensing element 56 is aligned with the inlet aperture 52 and as such may be removed from or inserted into the recess 54 without removing the head from the block. It should be readily apparent that the just described arrangement will facilitate the inspection and maintenance of marine engine cooling systems.

Figure 6:
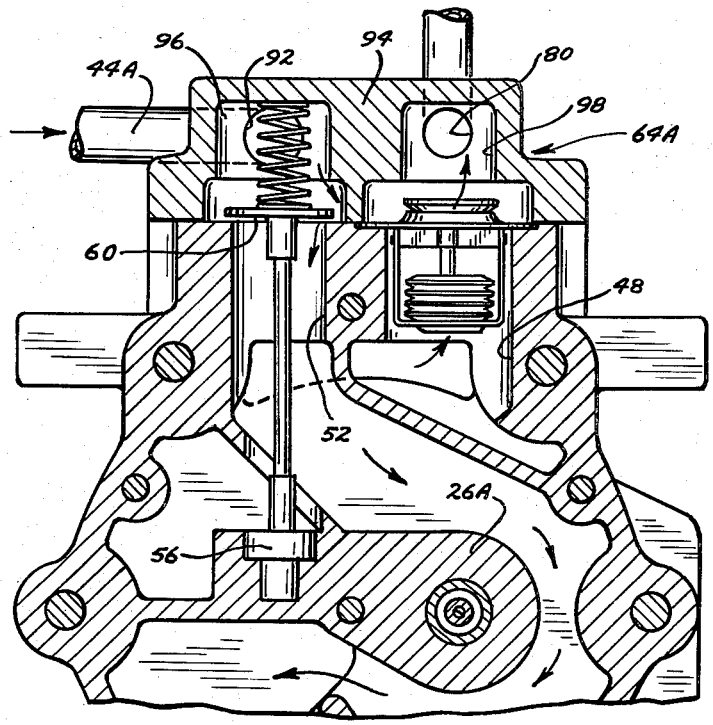
Fig. 6 illustrates a modification of the first embodiment in a vertical sectional view shown in the same plane as Fig. 2 illustration.

A modification of the present invention is shown in Fig. 6 wherein the water from the pump 36 is divided into two parallel fluid circuits rather than one circuit. The first circuit includes the tube 40, the cylinder block cooling chamber 32 and its outlet passageway 46 from whence the water is discharged through the tube 80. The second circuit provides cooling water from the pump 36 through the water reservoir 42 and the alternate tube 44A thence through the inlet aperture 92 formed in the modified cap 64A to provide cold water, such as 50° F., water from a northern lake in Minnesota, through the cylinder head inlet aperture 52 for cooling the cylinder head.

The modified cap 64A is removably attached to the head 16 as aforedescribed and has a central web 94 separating the aperture 52 from the aperture 48 for isolating the two described fluid circuits. The cap 64A has two independent fluid-holding chambers 96 and 98 which respectively provide for fluid communication through the tubes 44A and 80 from the head member cooling chamber 22 and the block chamber 32 to outside the engine.

In all other respects the operation of the embodiment is as aforedescribed for the first embodiment.

The advantage of the latter described cooling system is that by causing cold coolant to flow past the spark plug bosses 26 the operating temperatures of same are reduced to such an extent that the problem of cylinder portions becoming molten due to the heats of combustion is obviated. For example, with the element 56 designed to open the valve 60 at a temperature of 190° F. the modified system reduces the operating temperature of the spark plug boss 26A from 250° F. to 200° F. and thus reduces the cylinder 14 temperature accordingly. While the colder coolant in combination with the element 56 being spaced from the boss 26A is responsible for reducing the operating temperature of the spark plug boss, the control of that operating temperature is still derived directly from sensing a temperature directly related thereto. Additionally, the modified system maintains the engine operating temperature to the desired value when the engine is idling as aforedescribed.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. For use in an internal-combustion marine engine having a non-recirculating cooling system, a cylinder head member having recessed wall portions adapted to form the head of each engine cylinder and a coolant chamber for carrying coolant between an inlet means and an outlet means for cooling the wall portions, the improvement comprising a temperature sensing and valve actuating element inserted into one of the wall portions, a valve member disposed in one of the means and operatively connected to the element for unblocking the one means in response thereto, and means yieldably urging the valve member to close said one means.

2. In a cylinder head member having a plurality of cylinder head wall portions and each with means for containing an ignition element the operation of which varies with its temperature, the member having a cooling chamber for passing coolant past the means for cooling every ignition element and the head member, the chamber having a coolant inlet and outlet such that the coolant passes some of the means in series liquid circuit relation and such that one means closest the inlet is passed by coolant having the lowest temperature, a temperature sensing element embedded in the one means, a valve in the inlet and being operatively connected to the element for blocking the inlet when the one means temperature is below a predetermined value which is conducive to efficient ignition.

3. For use in an internal-combustion marine engine having a non-recirculating cooling system, a cylinder-head member having a plurality of recessed wall portions adapted to form the respective heads of engine cylinders, a coolant chamber in the head member and being adjacent the wall portions and having an inlet aperture in one end portion thereof, a spark plug boss in each wall portion, one of the bosses being adjacent the inlet aperture and having a recess aligned therewith and opening theretoward, a temperature sensing element seated in the recess, a valve disposed in juxtaposition to the aperture outside the head member and adapted to seat on the member around the aperture, and a rod operatively connecting the element and the valve and extending through the aperture.

4. For use in an internal-combustion marine engine having a non-recirculating coolant system and a cylinder block with a coolant chamber with a single outlet passageway, a cylinder head member adapted to seat on the block and having a fluid passageway adapted to be aligned with said single outlet and opening at one end of the head member to outside thereof, a jacketed cooling chamber in the head having an inlet aperture opening to outside the head adjacent the fluid passageway opening and with an outlet for discharging coolant from the engine, a unitary cap removably mounted on the head member one end and covering the opening such that a fluid holding chamber is formed outside the head member in communication with both openings, a spark plug boss formed in the head member and having an extension with a recess opening toward and aligned with said inlet aperture, a valve member disposed inside the cap chamber and over the inlet aperture, a temperature sensing element in the recess and having actuating means responsive to temperature changes in said extension, a rod connecting the valve and the actuating means, and a spring engaging the valve for yieldably urging it toward the aperture.

5. Apparatus as in the claim 4 wherein the cap chamber is divided by a web for forming a separate chamber at each opening and the cap having a separate means for providing fluid communication between the respective cap separate chambers and outside thereof.

6. Apparatus as in the claim 4 wherein the cylinder head has coolant discharge means on the lowest end thereof whereby when the valve member is blocking the inlet aperture the coolant is drained from the head cooling chamber.

7. For a marine-engine having a non-recirculating cooling system consisting of a separate cylinder block and cylinder head cooling chambers and each of which have inlet and outlet means, temperature means in the head for sensing the temperature thereof, a valve in the head chamber inlet means and operatively connected to said temperature means and responsive thereto for opening the inlet means only when the head member temperature exceeds a predetermined value, the head outlet means being at the lowest point of the cylinder head and being continuously opened, and fluid passage means communicatively coupling the block outlet means to the head inlet means.

8. For a marine engine having a non-recirculating cooling system including a separate cylinder head coolant holding chamber, a spark plug boss having a portion exposed within the chamber, means for sensing the temperature of the boss, and fluid flow control and passageway means in the engine and being for communicatively coupling the chamber to the cooling system for receiving coolant and operatively connected to the means and being responsive thereto when the sensed boss temperature is below a predetermined temperature for blocking the chamber from the cooling system and draining any coolant from the chamber and being further responsive to the means when a temperature greater than said predetermined temperature for restoring the communicative coupling to the cooling system whereby the boss temperature remains substantially constant throughout different operating speeds of the engine.

9. In an internal combustion marine engine having a cylinder head and block member each of which has an independent cooling chamber with an inlet and an outlet, a fluid passageway communicatively connecting the block chamber outlet to the head chamber inlet and having a bypass tube connected to the head chamber outlet, thermostatically controlled valve means in the head chamber inlet and having a temperature sensing element embedded in the head member, ignition means in the head member adjacent the element whereby the head jacket coolant flow is effectively controlled by the ignition means temperature, and fluid communication and supply means in communicative relation to the block inlet and head outlet for providing coolant therethrough in a non-recirculating manner.

10. In an internal combustion marine engine having a non-recirculating coolant system consisting of cooling chambers respectively in the cylinder block and head members with each chamber having an inlet and an outlet port for passing a coolant therethrough, a fluid passageway communicatively connected to the outlet port of the block member chamber for receiving coolant and to the head member inlet and outlet ports for forming a coolant bypass, a first thermostatic valve in the block member outlet port for unblocking the block outlet port only when the coolant temperature exceeds a first temperature within the block chamber, a second thermostatic valve in the head member inlet port and having a temperature sensing element embedded in the head member such that the water temperature has an insubstantial effect thereon and being for unblocking the head member inlet port only when the latter member temperature exceeds a second temperature whereby the head member temperature remains substantially constant irrespective of the temperature of the coolant flowing through the block ports, and coolant pump means communicatively connected to the block member inlet means.

11. In an internal combustion marine engine having a block and head member jointly forming a cylinder, the head member having a wall portion for containing ignition means for the cylinder, each member having a cooling chamber with an inlet and outlet port, coolant pump means communicatively connected to one chamber through its inlet port, a fluid passageway communicatively connecting the two chambers through the outlet port of the one chamber and the inlet port of the other chamber and having an independent passageway to outside the engine and the other chamber outlet port which is also communicatively connected to outside the engine for discharging coolant therefrom in a non-recirculatory manner, a valve member disposed in the head member inlet port for blocking same, a temperature sensing element embedded in the wall portion and being operatively connected to the valve member for moving same to unblock the latter port when the portion temperature exceeds a first temperature, and the independent passageway being for bypassing the coolant past the head member chamber when the valve is blocking its inlet port.

References Cited in the file of this patent

UNITED STATES PATENTS 2,741,231    Watkins _____ Apr. 10, 1956